US010005332B2

(12) United States Patent
Nehring (10) Patent No.: US 10,005,332 B2
(45) Date of Patent: Jun. 26, 2018

(54) TRAILER WEIGHT DISTRIBUTION HITCH SYSTEM STORAGE DEVICE

(71) Applicant: Terry Nehring, Tampa, FL (US)

(72) Inventor: Terry Nehring, Tampa, FL (US)

( * ) Notice: Subject to any disclaimer, the term of this patent is extended or adjusted under 35 U.S.C. 154(b) by 0 days. days.

(21) Appl. No.: 15/436,845

(22) Filed: Feb. 19, 2017

(65) Prior Publication Data
US 2017/0158008 A1   Jun. 8, 2017

Related U.S. Application Data

(63) Continuation of application No. 14/664,916, filed on Mar. 23, 2015, now Pat. No. 9,624,029.

(51) Int. Cl.
| | | |
|---|---|---|
| *B60R 11/00* | (2006.01) | |
| *B60D 1/54* | (2006.01) | |
| *B65D 85/00* | (2006.01) | |
| *B62D 53/06* | (2006.01) | |
| *B60D 1/06* | (2006.01) | |
| *B60D 1/24* | (2006.01) | |

(52) U.S. Cl.
CPC ............... *B60D 1/54* (2013.01); *B60D 1/06* (2013.01); *B60D 1/247* (2013.01); *B62D 53/068* (2013.01); *B65D 85/70* (2013.01)

(58) Field of Classification Search
CPC .... B60D 1/58; B60D 1/60; B60R 7/08; B60R 11/00; B60R 2011/0096; B60R 2011/0098; B60R 2011/0082
USPC ....... 224/571, 545, 546, 547, 548, 555, 567, 224/569, 527, 537
See application file for complete search history.

(56) References Cited

U.S. PATENT DOCUMENTS

| | | | | | |
|---|---|---|---|---|---|
| 3,861,572 | A | * | 1/1975 | Norris | B60P 3/38 135/153 |
| 3,891,262 | A | * | 6/1975 | Brunel | B60P 7/06 211/192 |
| 3,990,536 | A | * | 11/1976 | Wilburn | A01M 31/02 114/351 |
| 4,046,398 | A | * | 9/1977 | Dunwoody | B60D 1/46 224/519 |
| 4,834,273 | A | * | 5/1989 | Cimino | B60P 3/36 224/42.21 |
| 5,052,601 | A | * | 10/1991 | Carter | B60P 7/15 211/60.1 |
| 5,104,083 | A | * | 4/1992 | Shannon | B60R 7/10 211/105.1 |
| 5,106,002 | A | * | 4/1992 | Smith | B60R 9/065 224/506 |

(Continued)

*Primary Examiner* — Brian D Nash
(74) *Attorney, Agent, or Firm* — FYPA, PLLC; Chris Tanner, Esq.

(57) ABSTRACT

A vehicle mounted storage device for the ball mount and spring/torsion bar component of a trailer weight distribution system when the equipment is not in use. The storage device is comprised of a horizontal channel where the spring bars can be inserted, a vertical channel, where the ball mount can be inserted, and a horizontal tongue separating the two channels. When the spring bars are inserted into the horizontal channel with the heads of the spring bars resting on the tongue area and the ball mount is inserted into the vertical channel with the hitch ball directly above the spring bar heads, the spring bars are securely confined to the device. Once a locking device has been affixed to the ball mount, the device deters theft of the spring bars and ball mount.

19 Claims, 9 Drawing Sheets

(56) References Cited

U.S. PATENT DOCUMENTS

| | | | | |
|---|---|---|---|---|
| 5,118,156 A * | 6/1992 | Richard | B60R 9/00 | 224/331 |
| 5,137,322 A * | 8/1992 | Muirhead | B60R 9/00 | 296/39.2 |
| 5,187,744 A * | 2/1993 | Richter | B60R 11/0241 | 224/553 |
| 5,275,314 A * | 1/1994 | Todenhagen | E01H 5/066 | 224/402 |
| 5,338,146 A * | 8/1994 | Hindt | B60P 3/12 | 224/282 |
| 5,372,287 A * | 12/1994 | Deguevara | B60R 9/06 | 224/309 |
| 5,423,650 A * | 6/1995 | Zerbst | B60R 9/042 | 224/310 |
| 5,431,522 A * | 7/1995 | Ross | B60R 9/06 | 224/497 |
| 5,579,972 A * | 12/1996 | Despain | B60R 9/06 | 224/506 |
| 5,720,492 A * | 2/1998 | Wanzenried | B62D 53/08 | 224/401 |
| 5,735,410 A * | 4/1998 | Kallstrom | B60R 9/10 | 211/20 |
| 5,848,744 A * | 12/1998 | Dischner | B60H 1/00014 | 224/404 |
| 6,007,036 A * | 12/1999 | Rosen | B60R 11/0235 | 224/281 |
| 6,637,765 B2 * | 10/2003 | Barton | B60D 1/065 | 280/432 |
| 6,641,014 B2 * | 11/2003 | McNalley | B60R 7/14 | 224/281 |
| 6,712,248 B2 * | 3/2004 | Mitchell | B60R 9/06 | 224/498 |
| 6,725,855 B1 * | 4/2004 | Brennan | A47J 37/0763 | 126/276 |
| 7,661,543 B1 * | 2/2010 | Townsend | B60D 1/52 | 211/4 |
| 8,186,702 B2 * | 5/2012 | McCoy | B60D 1/247 | 280/406.1 |
| 8,226,106 B2 * | 7/2012 | Hensley | B60D 1/06 | 280/462 |
| 8,226,107 B2 * | 7/2012 | Columbia | B60D 1/06 | 280/495 |
| 8,308,183 B1 * | 11/2012 | McElhinney, Jr. | | 280/491.5 |
| RE44,454 E * | 8/2013 | Aghajanian | B60R 9/06 | 224/499 |
| 8,627,990 B2 * | 1/2014 | Nakajima | B62J 9/008 | 224/420 |
| 8,672,200 B2 * | 3/2014 | O'Hare | B60R 9/06 | 224/519 |
| 8,893,939 B2 * | 11/2014 | Brass | B60D 1/60 | 224/515 |
| 2003/0230608 A1 * | 12/2003 | Henry | B60D 1/06 | 224/403 |
| 2011/0031287 A1 * | 2/2011 | Le Gette | F16M 11/04 | 224/101 |
| 2011/0057008 A1 * | 3/2011 | Clausen | B60R 9/06 | 224/504 |
| 2015/0163936 A1 * | 6/2015 | Le Gette | F16M 11/04 | 206/45.2 |
| 2016/0039259 A1 * | 2/2016 | Elliott | B60D 1/46 | 280/507 |

* cited by examiner

TRAILER WEIGHT DISTRIBUTION HITCH SYSTEM STORAGE DEVICE

CROSS-REFERENCE TO RELATED APPLICATIONS

This application clams priority to U.S. application Ser. No. 14/664,916, filed on Mar. 23, 2015, the entire contents of which are hereby incorporated by reference.

BACKGROUND

When a trailer is connected to a vehicle, there is an inevitable addition of weight to the rear of the vehicle. The added weight can alter the handling of the vehicle due to the imbalance of weight from the front to the rear. Trailer weight distribution systems have been designed to address these problems by restoring even balance across all axles of the vehicle and trailer. Their aim is to enable the vehicle to be driven at the maximum legal speed while not compromising on safety.

A trailer weight distribution system is made up of the ball mount, spring/torsion bars (spring bars and torsion bars are both common and acceptable terminology for the same item and will be referred to as spring bars hereafter) and trailer frame mounted brackets. The trailer frame mounted brackets are installed directly to the trailer frame using tools and once installed remain in place for the life of the trailer weight distribution system. The ball mount and spring bars, however, will likely be removed from the vehicle and trader when not in use.

The need to remove the ball mount and spring bars when the trailer weight distribution system is not in use can create issues for the system owners, especially when being used with a recreational vehicle, where oftentimes once the vehicle reaches campsite or home the owner will want to disconnect the towing vehicle from the trailer. This creates the issue of where to store the ball mount and spring bars while the towing vehicle and trailer are disconnected. While at home, an owner may store these components in their garage, but this type of storage facility will be unavailable when not at home.

These systems are expensive and universal, therefore, the ball mounts and spring bars are susceptible to theft. Therefore, an owner will want these components properly secured to prevent damage as well.

Additionally, the ball mounts and spring bars are bulky and oftentimes coated in grease and oil. For this reason storage of these components in the trunk of the towing vehicle or inside the recreational vehicle is not ideal.

Finally, trailer weight distribution systems are available in several different designs including: round spring bars, trunnion spring bars where the trunnion is attached to the bar, trunnion spring bars where the trunnion head is fixed to the ball mount.

SUMMARY

The aim of the present invention is to provide an apparatus that can overcome the detailed issues that can arise with the storage, security and handling of ball mounts and spring bars for trailer weight distribution systems, One aim of the invention is to provide an apparatus that can be affixed to the tongue of the trailer, providing a storage location near the trailer/tow vehicle hitch connection to minimize the travel handling necessary to transport the components when installing or stowing the trailer weight distribution system.

Another aim of the invention is to provide an apparatus that can be affixed to nearly any supporting structure on the towed vehicle that the owner of the vehicle wishes to affix the apparatus to.

Another aim of the invention is to provide an apparatus that securely holds the components in place so that they are not damaged while in storage.

Another aim of the invention is to provide such an apparatus which does not obstruct the towed vehicle on which it is mounted so that the vehicle can be driven or otherwise operated while the device is so deployed.

Another aim of the invention is to provide such an apparatus which does not obstruct the towed vehicle on which it is mounted and can be used to mount additional accessories when the hitch components are being utilized during driving.

Another aim of the invention is to provide an apparatus that enables a locking device to be affixed to stowed assembly that will deter theft of the ball mount and spring bars.

The final aim is to provide an apparatus that is universal, such that one design can be configured to accommodate storing and securing different variations of the trailer weight distribution systems.

The trailer weight distribution system storage device of the present invention includes a base plate that is clamped to the frame of a trailer. Incorporated into the base plate is a vertical shank channel, two horizontal bolt holes and two downward sloping support members. The shank channel is sized to allow a ball mount shank to be inserted vertically into the channel. The two bolt holes provide a location to mount a pivoting spring bar channel and the two downward sloping members provide a stop for the pivoting spring bar channel.

Included in the trailer weight distribution system storage device is also a "U" shaped spring bar channel with two top cross braces for inserting the spring bars. On the bottom of the spring bar channel are two tabs with horizontal bolt holes. The tabs and holes in the spring bar channel are connected to the horizontal holes in the base plate via bolts to create a pivoting joint so that the spring bar channel is generally in a horizontal position. The pivoting joint allows adjustment of the spring bar channel to angle upward or downward to avoid interference with any gas lines or battery or other attachments that may be present at the tongue of the trailer.

In order to stow the trailer weight distribution system, the spring bars first are inserted into the spring bar channel with the ends that interface with the trailer frame mounted brackets furthest from the trailer frame, and the ends which interface with the ball mount are closest to the frame. Once the spring bars are installed, the ball mount is inserted into the shank channel on the base mounting bracket.

Once installed, the spring bars are restrained from removal from the storage system by the spring bar channel on one side and the ball mount on the other and the cross braces and hitch ball on the top.

A locking device is then placed in a hole on shank of the ball mount below the shank channel in base mounting bracket. Once the locking device has been placed on the shank of the ball mount the ball mount is secured from removal from the trailer weight distribution storage system as well, ensuring that the both the ball mount and the spring bars are protected from theft and damage.

BRIEF DESCRIPTION OF THE DRAWINGS

For a better understanding of the particular embodiments of the present invention reference may be made to the following drawings exemplary of the invention, in which.

DETAILED DESCRIPTION OF THE INVENTION AND PREFERRED EMBODIMENT

Figure 1:
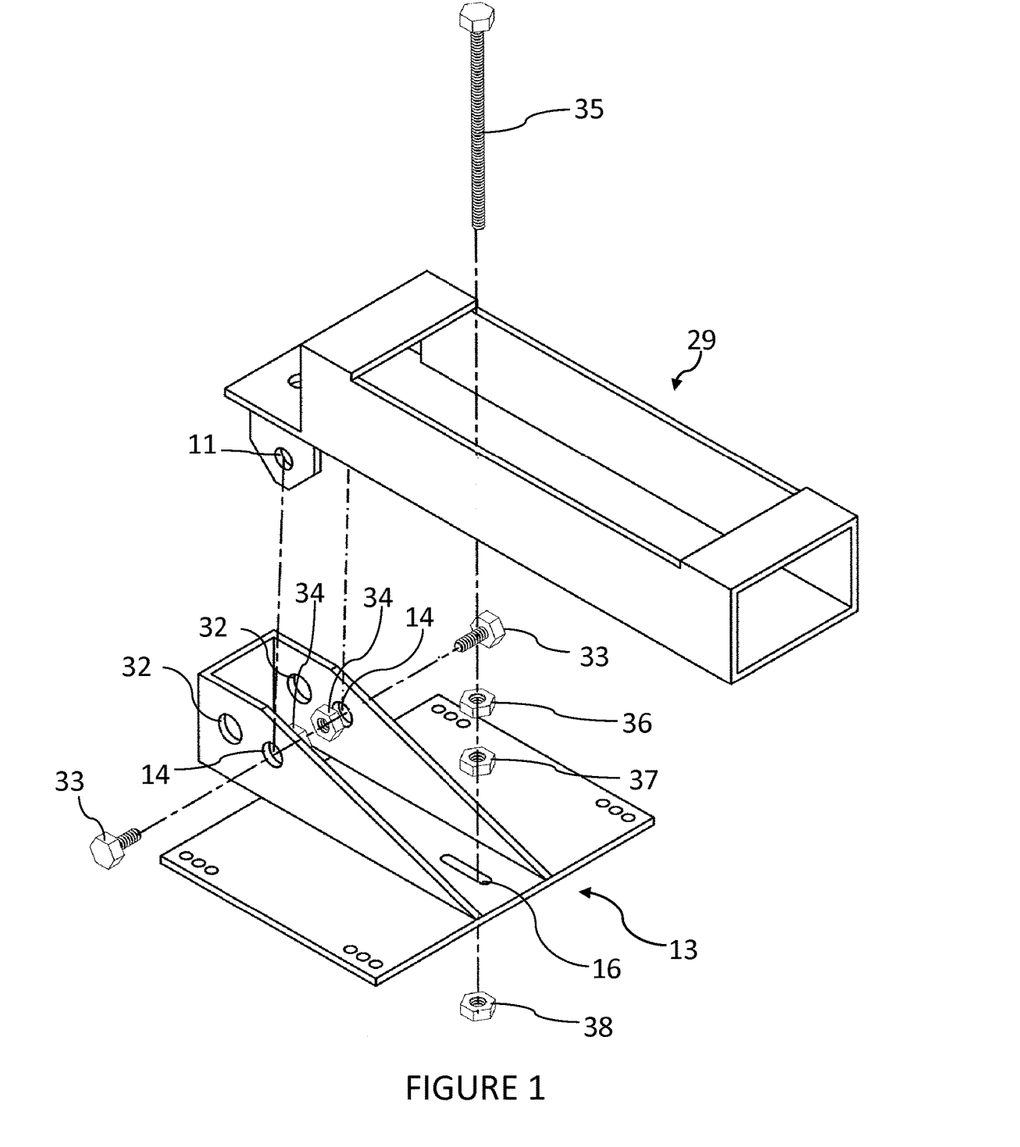
FIG. 1 is a perspective view assembly drawing for a trailer weight distribution system storage device.

As shown in FIG. 1, the present invention provides a trailer weight distribution system storage device. As mentioned the trailer weight distribution system storage device is for storing a ball mount 4 (ball mount depicted in the drawings is representative of the mount used for each type of trailer weight distribution system) and various types of spring bars; including round spring bars 1, trunnion spring bars where the trunnion head is attached to the bar 2, and trunnion spring bars where the trunnion head is fixed to the ball mount 3. The other components of a trailer weight distribution system including the towing vehicle hitch, trailer frame mounted brackets, and chains are not depicted as they are not integral to the invention and are well known to those skilled in the art.

With the exception of the nuts, washers, and bolts used for assembling the equipment, the materials of construction for the preferred embodiment of the invention is an iron alloy such as steel, which is then powder coated due to cost considerations and ease of manufacture. However, the invention could constructed of any number of materials known to those skilled in the art that have good strength properties and are sufficiently weather resistant.

Additionally, preferred embodiment of materials of construction for the nuts, washers, and bolts used on assembling the equipment is stainless steel due to its weather resistance properties. However, the nuts, washers, and bolts could constructed of any number of materials known to those skilled in the art that have good strength properties and are sufficiently weather resistant.

Referring to FIGS. 1-5 and 9-11, one of the primary components of the trailer weight distribution system storage device is the spring bar holder 29. The spring bar holder 29 is made up of a spring bar channel 5, tongue 7, cross braces 9 and two parallel tabs 10.

Figure 3:
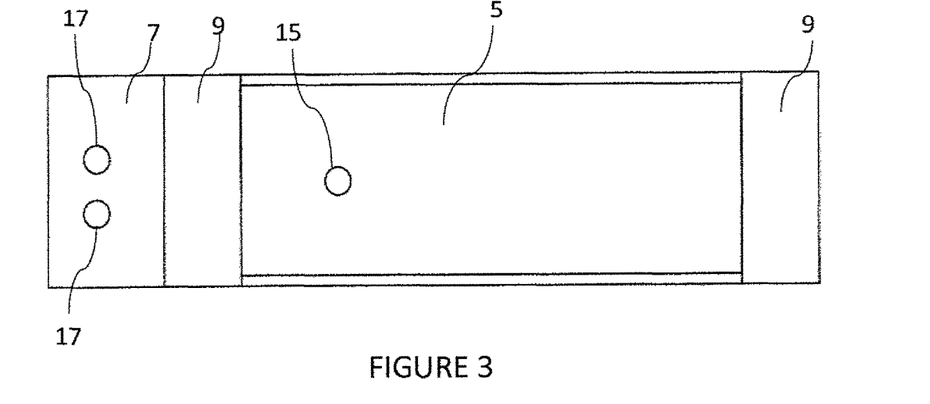
FIG. 3 is a plan view of the spring bar holder.
Figure 4:
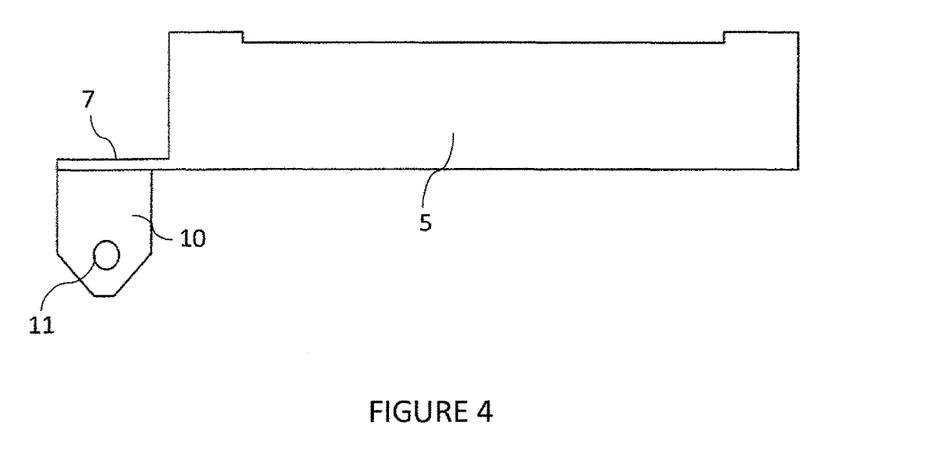
FIG. 4 is a side view of the spring bar holder.
Figure 5:
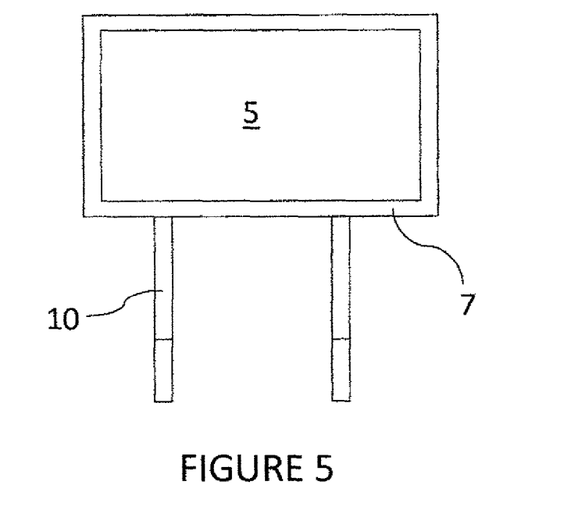
FIG. 5 is a front view of the spring bar holder.

Referring to FIGS. 3, 4 and 5 the spring bar channel 5 is a rectangular channel with no top. The rectangular channel 5 needs to be wide enough and tall enough to provide a gap to allow the spring bars 1, 2, 3 to be inserted into the channel 5, but not so wide and tall to provide enough of a gap that the spring bars 1, 2, 3 can be removed from the trailer weight distribution system storage device once the ball mount 4 has been inserted into the shank channel 6. The length of the channel 5 can be variable, however, the channel 5 should be long enough so that the center of mass of the spring bars does not extend past the end of the channel 5.

Referring to FIGS. 3 and 4, preceding the front end of the spring bar channel 5 is a flat rectangular tongue 7 on the base of the channel 5 that protrudes from the front of the channel 5. The tongue 7 is the same width as the channel 5. The tongue 7 needs to be long enough to provide a gap that will allow the ells on the round spring bars 1 and the trunnion heads 47 on the trunnion spring bars where the trunnion head is attached to the bar 2 to fit between the ball mount 4 and the shank channel 6 but not so long as to not provide enough of a gap that the spring bars can be removed from the trailer weight distribution system storage device once the ball mount 4 has been inserted into the shank channel 6.

Referring to FIG. 3, across the top of the spring bar channel there is a cross brace 9, or any number of cross braces 9, that traverse the open top of the spring bar channel 5. The width of the cross braces 9 can vary greatly, however, the smaller the width, less materials will be required to fabricate the unit. The cross brace(s) 9 can be affixed to the spring bar channel 5 by any means known to those skilled in the art, preferably welded. The function of the cross brace 9 is to prevent the spring bars 1, 2, 3 from being removed from the top of the trailer weight distribution system storage device once the ball mount 4 has been inserted into the shank channel 6.

Referring to FIGS. 4 and 5, there are two parallel tabs 10 affixed to the bottom of the spring bar holder 29 at the front end of the tongue 7. Near the bottom edge of each of these tabs 10 are a hole 11, centered in the tab 10 and traversing the tab 10. These tabs 10 will be used to form a hinged connection 12 between the spring bar holder 29 and base plate 13. The tabs 10 and these holes 11 are to be aligned such that they correspond to the adjoining hinge holes 14 on the base plate 13 so that the two form a hinged connection 12 that moves freely and smoothly. These tabs 10 can be affixed to the tongue 7 by any means known to those skilled in the art, preferably welded.

Referring to FIG. 3, there is a height adjustment hole 15 drilled through the centerline of the base of the spring bar channel 5. This hole 15 will be used to adjust and fix the angle of the hinged connection 12 in a manner that will be described in greater detail later in this specification. The hole 15 should be located along the length of the spring bar channel 5 such that when the spring bar holder 29 is installed on the base plate 13, and spring bar holder 29 and base plate 13 are parallel to each other, that the center of the height adjustment hole 15 aligns with the center of the height adjustment slot 16 in the base plate 13 that will be discussed in greater detail further in this specification.

Referring to FIG. 3, there are two trunnion bar pin holes 17 drilled through the tongue. These holes 17 will be used insert retention pins 18 in holes 49 in the trunnion spring bars where the trunnion head is fixed to the ball mount 4 in a manner which will be discussed in further later in this specification. These holes 17 be used to prevent these types of trunnion bars 3 from being removed from the trailer weight distribution system storage device once the ball mount 4 has been inserted into the shank channel 6.

Referring to FIGS. 1-2 and 6-11, another one of the primary components of the trailer weight distribution system storage device is the base plate 13. The base plate is made up of a flat plate 20, two sloped support members 23, bar 31, and the vertical shank channel 6.

Figure 6:
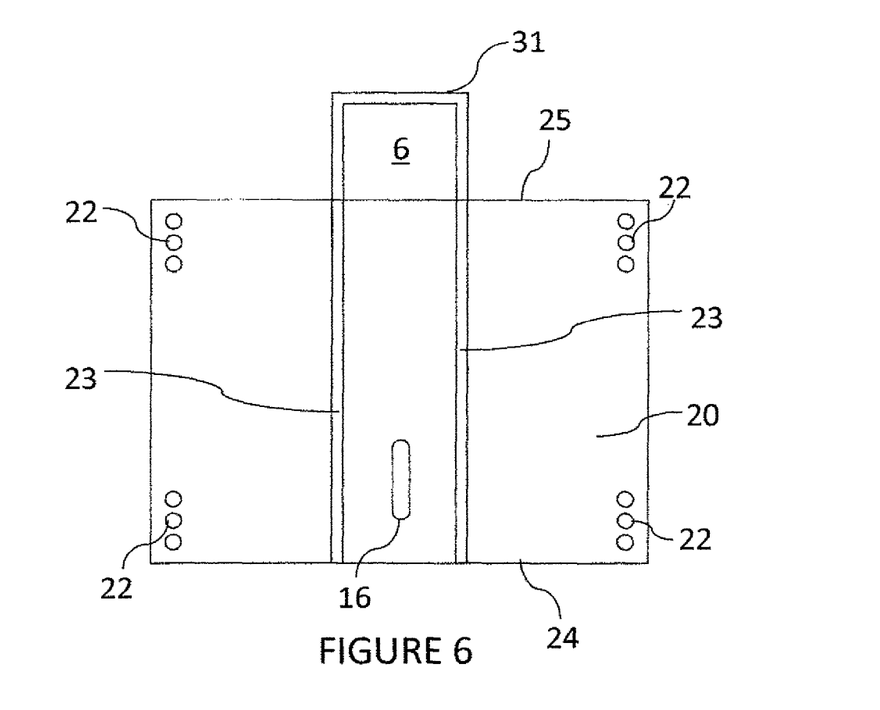
FIG. 6 is a plan view of the base plate.

Referring to FIG. 6, in the in the preferred embodiment of this invention, the flat plate component 20 of the base plate 13 is a square roughly twice the width of the spring bar holder 29 and has through holes 22 drilled though the corners, however, the size of the flat plate 20 and the need for through holes 22 can vary greatly depending on the method used to affix the trailer weight distribution system storage device to the vehicle support member 39.

Referring to FIG. 6, there is a height adjustment slot 16 drilled through the centerline of the flat plate 20 of the base plate 13. This slot 16 will be used to adjust the angle of hinged connection 12 in a manner that will be described in greater detail later in this specification. The slot 16 should be located along the rear edge of the flat plate 24 such that when the spring bar holder 29 is installed on the base plate 13, and spring bar holder 29 and base plate 13 are parallel to each other, that the center of the height adjustment slot 16 aligns with the center of the height adjustment hole 15 in the spring bar holder 29.

Figure 7:
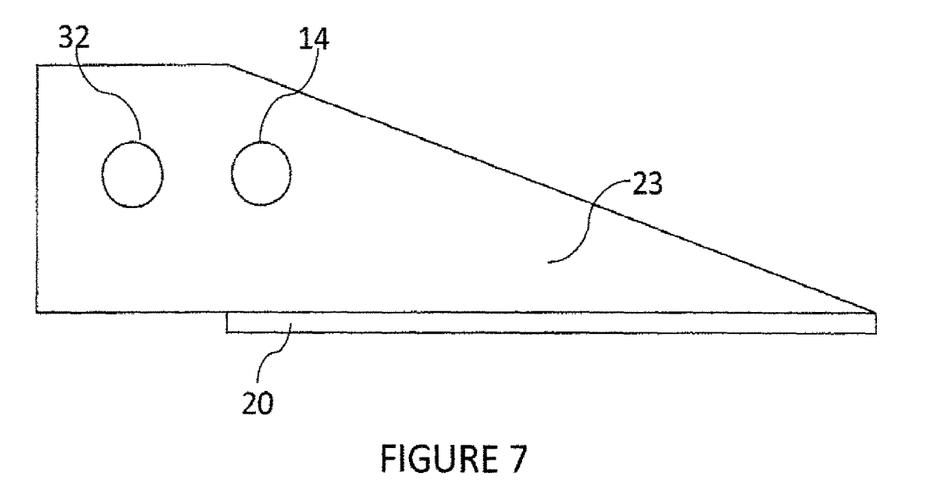
FIG. 7 is a side view of the base plate.
Figure 8:
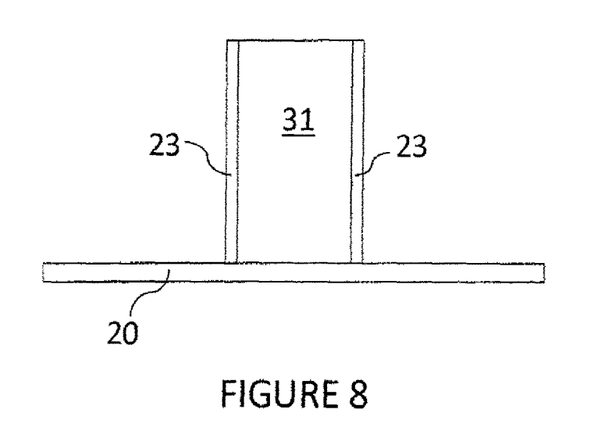
FIG. 8 is a front view of the base plate.

Referring to FIGS. 6, 7 and 8, affixed to the flat plate 20 member of the base plate 13 there are two support members which slope downward 23 from the front edge 25 of the base plate to rear edge of the plate 24. The function of the downward sloping members 23 are to provide a maximum downward angle of spring bar holder 29 thus preventing the spring bars 1, 2, 3 from contacting the ground and providing support for the attached shank channel 6. The support members 23 run parallel to and are equally offset from the centerline of the height adjustment slot 16. The offset distance should be slightly greater than ½ the width of the ball mount shank 27. These support members 23 can be affixed to the flat plate 20 by any means known to those skilled in the art, preferably welded.

Referring to FIG. 7, there are two hinge holes 14 drilled through the downward sloping support members 23. These hinge holes 14 need to be located high enough from the flat plate 20 so that the holes 11 in the parallel tabs 10 on the spring bar holder 29 can be aligned with these holes 14 without the ends of the tabs 10 interfering with the flat plate 20. These hinge holes 14 work in conjunction with the two parallel tabs 10 affixed to the bottom of the spring bar holder 29 so that the two components can form a hinged connection 12 that rotates freely and smoothly.

Referring to FIGS. 6, 7 and 8, affixed to the flat plate 20 member of the base plate 13 and integrated into the two support members 23 which slope downward is a shank channel 6. The shank channel 6 shall be used to support the ball mount 4 when being stowed. The shank channel 6 is a "U" shaped support channel that is formed by extending the front side of the parallel support 23 members beyond the front edge 25 of the flat base plate a distance slightly greater than the width of the ball mount shank 27. Affixed to the front edge of the parallel members 23 and connecting the two parallel support members is a bar 31 the same height as the support member members 23. The resulting structure is a square vertical shank channel 6 slightly larger than the square ball mount shank 27. The shank channel 6 can be affixed to the flat plate 20 and support members 23 by any means known to those skilled in the art, preferably welded.

Referring to FIG. 7, there are two apparatus holes 32 drilled through the side of the shank channel 6. These apparatus holes 32 should be centered in the middle of the shank channel 6. These apparatus holes 32 will allow another apparatus with corresponding holes, such as a bicycle rack, to be inserted in the place of the ball mount 4. Having the ability to substitute various attachments for the ball mount provides additional versatility to the invention.

Referring to FIG. 1, the trailer weight distribution system storage device is assembled by first aligning the holes on the sloping members of the base plate 14 and the holes on the tabs of the spring bar holder 11 and inserting a joining device that allows creates a hinged connection that rotates freely and smoothly. In the preferred embodiment this is achieved using a bolt 33 and self-locking nut 34, but this function could also be achieved through use of a pin device, riveting device or any other means known to those skilled in the art.

Referring to FIG. 1, once the base plate 13 and spring bar holder 29 have been hinged together, a long bolt 35 is inserted downward through the height adjustment hole 15 in the spring bar channel 5. A first nut 36 is threaded onto the bolt and tightened against the bottom of the spring bar channel S. A second nut and washer 37 is then threaded onto the bolt to a level above that of the base plate 13, and the bolt is then inserted into the height adjustment slot 16 in the base plate 13. A third nut and washer 38 is then threaded onto the bolt 35 and tightened to the bottom of the base plate 13. If one wants to adjust the angle of the spring bar holder 29, they can simply loosen the two bottom nuts 37 & 38, move the spring bar holder 29 up or down to the desired angle, and then re-tighten the two nuts 37 & 38 against the base plate 13 to fix the angle and prevent up/down movement.

Figure 2:
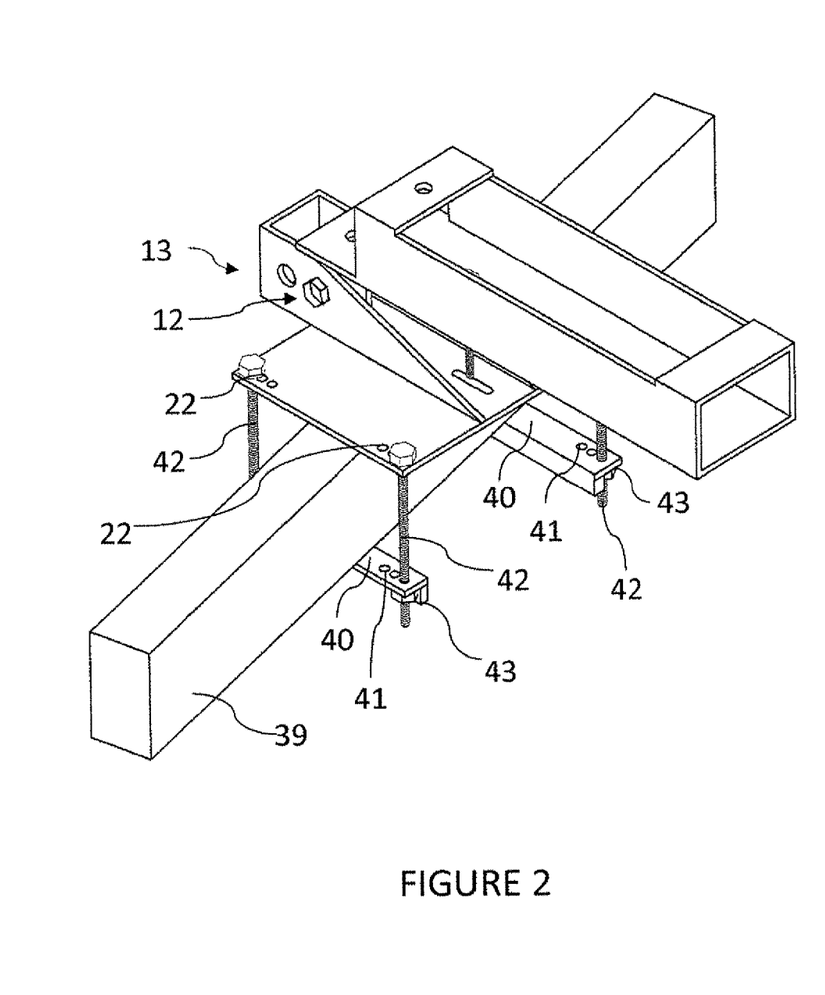
FIG. 2 is a perspective view of an assembled trailer weight distribution system storage device clamped to the tongue of a trailer.

Referring to FIG. 2, the preferred embodiment for affixing the trailer weight distribution system storage device to a support structure 39, such as the frame of a trailer, is through sandwich clamping. This is preferred because it is minimally invasive to the support member and allows the spring bar channel to protrude from the vehicle support member in a variety of angles other than perpendicular. However, this function could also be achieved through use of welding the trailer weight distribution system storage device to the support member, bolting the device directly to the support member, integrating the base plate into the construction of the support member, or any other means known to those skilled in the art. These more invasive methods are not preferred because the welding or drilling may affect the vehicle warranty.

Referring to FIG. 2, in the preferred embodiment the base plate 13 has clamping holes drilled through the four corners 22. The size of the plate 13 is long enough that the four corners of the plate 13 extend to either side of the support structure 39.

Referring to FIG. 2, in addition to the base plate 13, two corresponding ell brackets 40 of the same length as the base plate 13, with corresponding holes 41 drilled through them are used to clamp the base plate 13 to the support structure 39. The bottom of the base plate 13 is aligned to the desired position the top of support structure 39 and the ell brackets 40 are aligned so that the mounting holes 41 correspond to those on the base plate 22. Long bolts 42 are inserted downward through the base plate 13 and through the ell bracket holes 41 where nuts 43 are threaded onto them and tightened to hold the trailer weight distribution system storage device in position.

Figure 9:
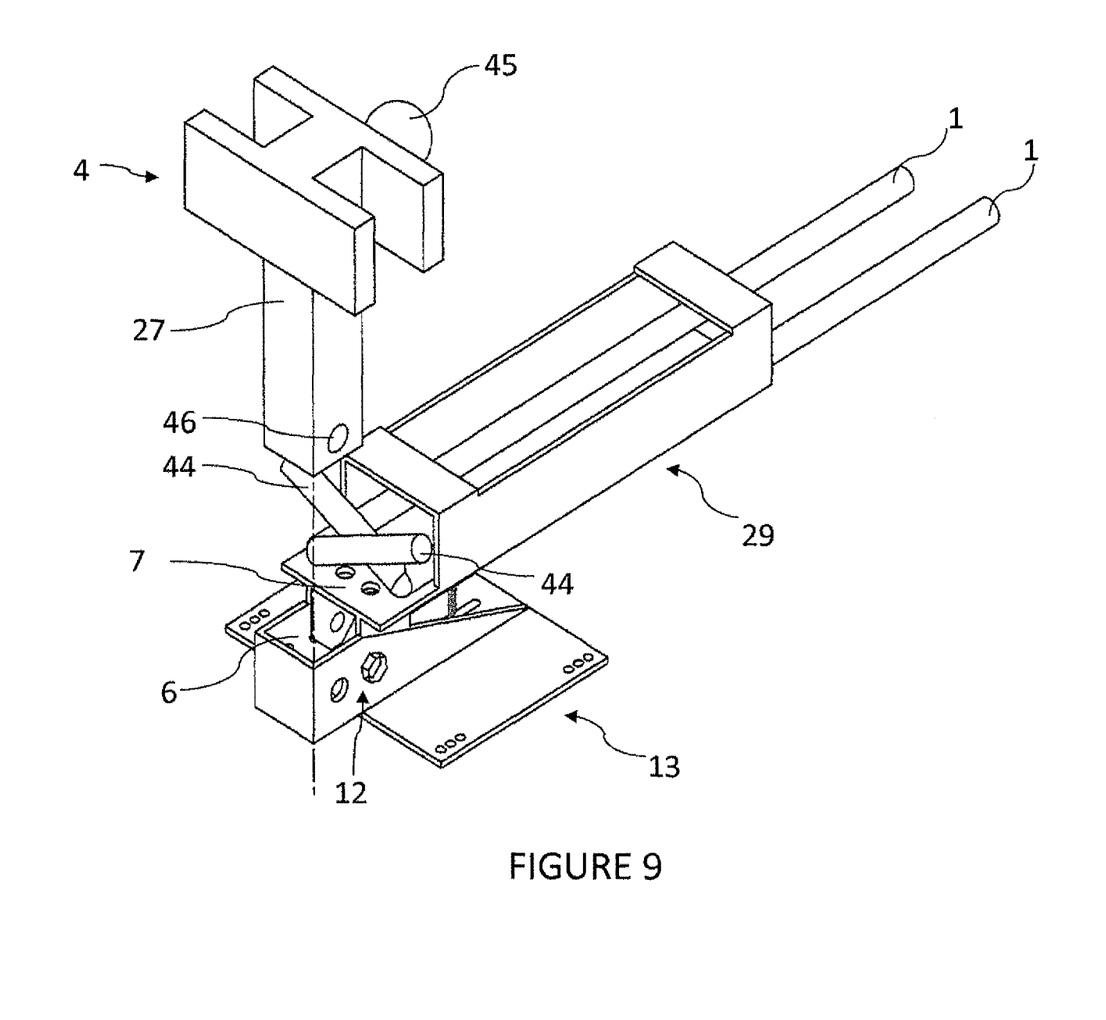
FIG. 9 is a perspective view installation drawing for a trailer weight distribution system that utilizes round spring bars.

Referring to FIG. 9, a round spring bar 1 weight distribution system is stowed in the trailer weight distribution system storage device by first inserting the spring bars 1 into the spring bar holder 29. The spring bars 1 are oriented such that the spring bar ells 44 are resting on the tongue 7 of the spring bar holder 29 and the ells 44 are crisscrossed. Once the spring bars have been properly inserted, any necessary adjustments to the angle of the spring bar holder 29 are made using the method described above. After the spring bars 1 have been inserted arid the angle has been adjusted, the ball mount 4 is inserted into the shank channel 6 with the hitch ball 45 facing the spring bar ells 44. The ball mount shank 27 must be inserted far enough into the shank channel 6 that the lock hole 46 on the shank can be accessed below the bottom of the shank channel 6. Additionally, the ball mount 4 needs to be oriented so that it restrictsmovement of the spring bar ells 44. Restricting the movement of these ells 44 is critical, so that the bars cannot be oriented into a manner that would allow them to be removed from the device in an unintended manner. Once the ball mount 4 is properly installed in the shank channel 6, a locking device (not pictured but known to those skilled in the art) is installed in the shank locking device hole 46.

Figure 10:
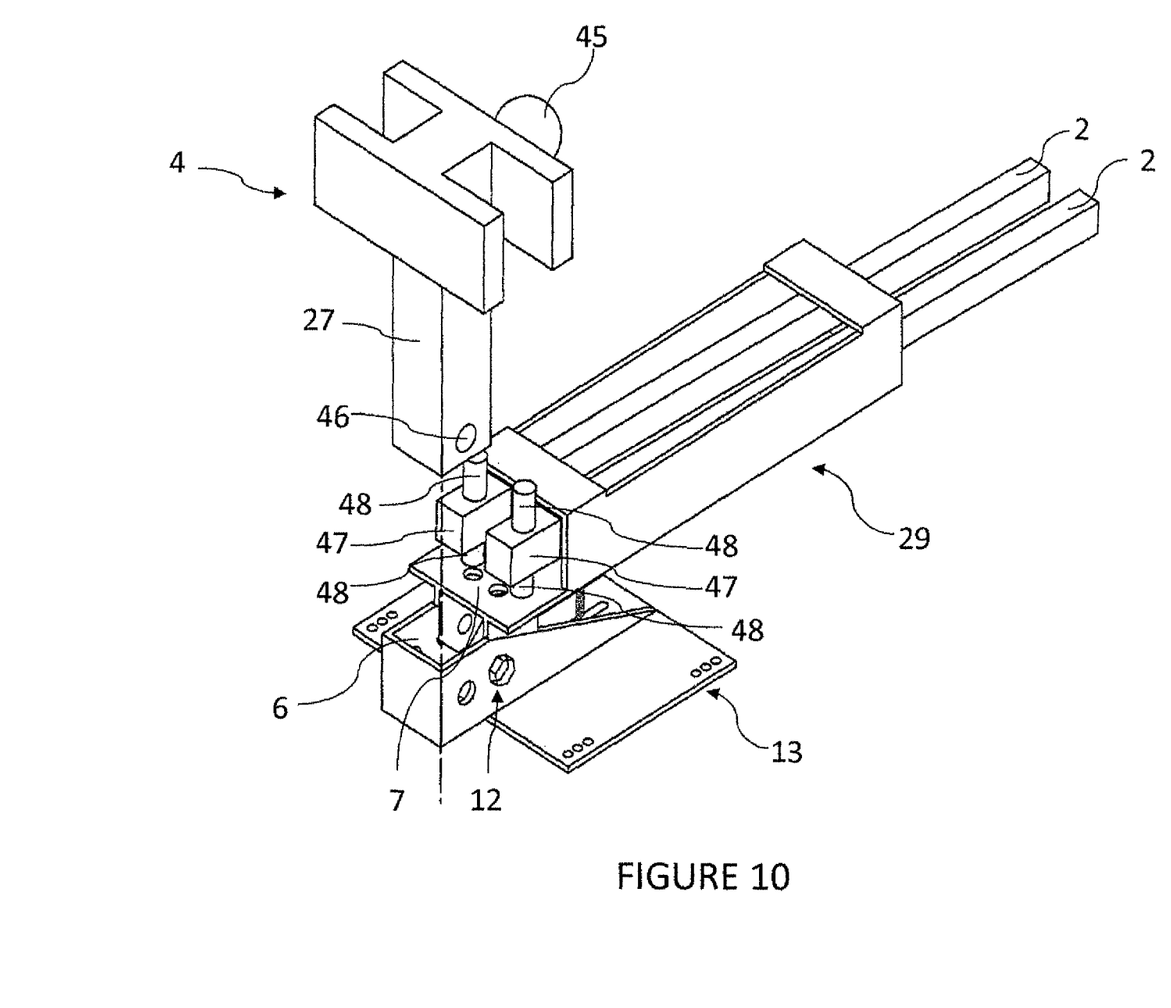
FIG. 10 is a perspective view installation drawing for a trailer weight distribution system that utilizes trunnion spring bars where the trunnion head is attached to the bar.

Referring to FIG. 10, a weight distribution system trunnion spring bars where the trunnion head is attached to the spring bar 2 is properly stowed in the trailer weight distribution system storage device by first inserting the spring bars 2 into the spring bar holder 29. The spring bars 2 are oriented such that the spring bar trunnions 47 are resting on the tongue 7 of the spring bar holder 29 and the two protruding ends 48 on the trunnions 47 are facing up and down. Once the spring bars 2 have been properly inserted, any necessary adjustments to the angle of the spring bar channel are made using the method described above. After the spring bars 2 have been inserted and the angle has been adjusted, the ball mount 4 is inserted into the shank channel 6 with the hitch ball 45 facing the spring bars 2. The ball mount shank 27 must be inserted far enough into the shank channel 6 that the lock hole 46 can be accessed below the bottom of the shank channel 6. Once the ball mount 4 is properly installed in the shank channel 6, a locking device (not pictured but known to those skilled in the art) is installed in the shank locking device hole 46.

Figure 11:
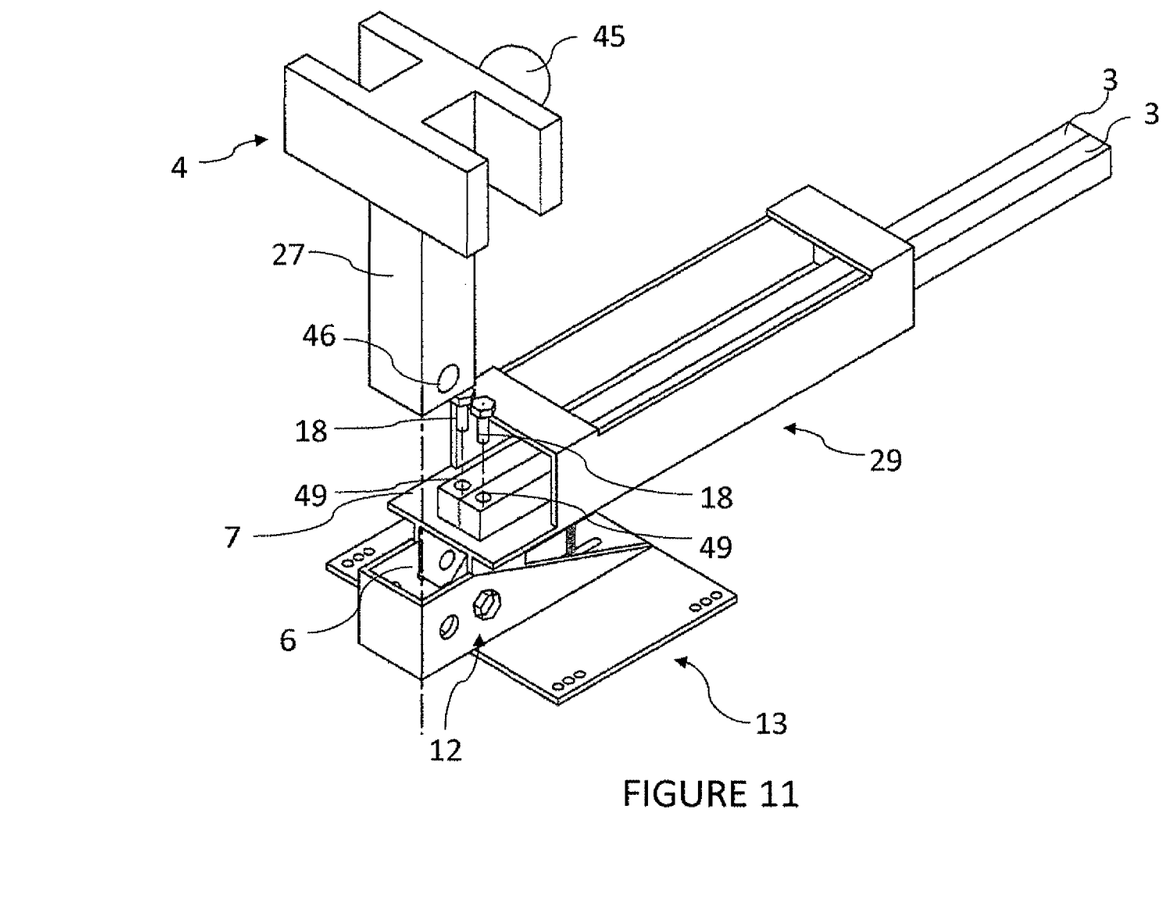
FIG. 11 is a perspective view installation drawing for a trailer weight distribution system that utilizes trunnion spring bars where the trunnion head is fixed to the ball mount; and, FIG. 12 is a perspective view drawing for an alternate embodiment for the trailer weight distribution system storage device.

Referring to FIG. 11, a trailer weight distribution system with trunnion spring bars where the trunnion head is fixed to the ball mount 4 is properly stowed in the trailer weight distribution system storage device by first inserting the spring bars 3 into the spring bar holder 29. The spring bars 3 are oriented such that the pin holes 49 in the spring bar which are used to connect the spring bar to trunnions on the ball mount are aligned with the two trunnion bar pin holes 17 drilled through the tongue. Two pins 18 are then inserted through the aligned holes on the spring bar 49 and tongue 7. Once the spring bars 3 and pins 18 have been properly inserted, any necessary adjustments to the angle of the spring bar holder 29 are made using the method described above. After the spring bars 3 have been inserted and the angle has been adjusted, the ball mount 4 is inserted into the shank channel 6 with the hitch ball 45 facing the spring bars 3. The ball mount shank 27 must be inserted far enough into the shank channel 6 that the lock hole 46 can be accessed below the bottom of the shank channel 6. Additionally, the ball mount 4 needs to be oriented so that restricts access from removing the pins 18. Preventing the removal of these pins 18 is critical, as once these pins 18 are removed, the spring bars 3 can easily be slid out spring bar holder 29. Once the ball mount 4 is properly installed in the shank channel 6, a locking device (not pictured but known to those skilled in the art) is installed in the shank locking device hole 46.

Figure 12:
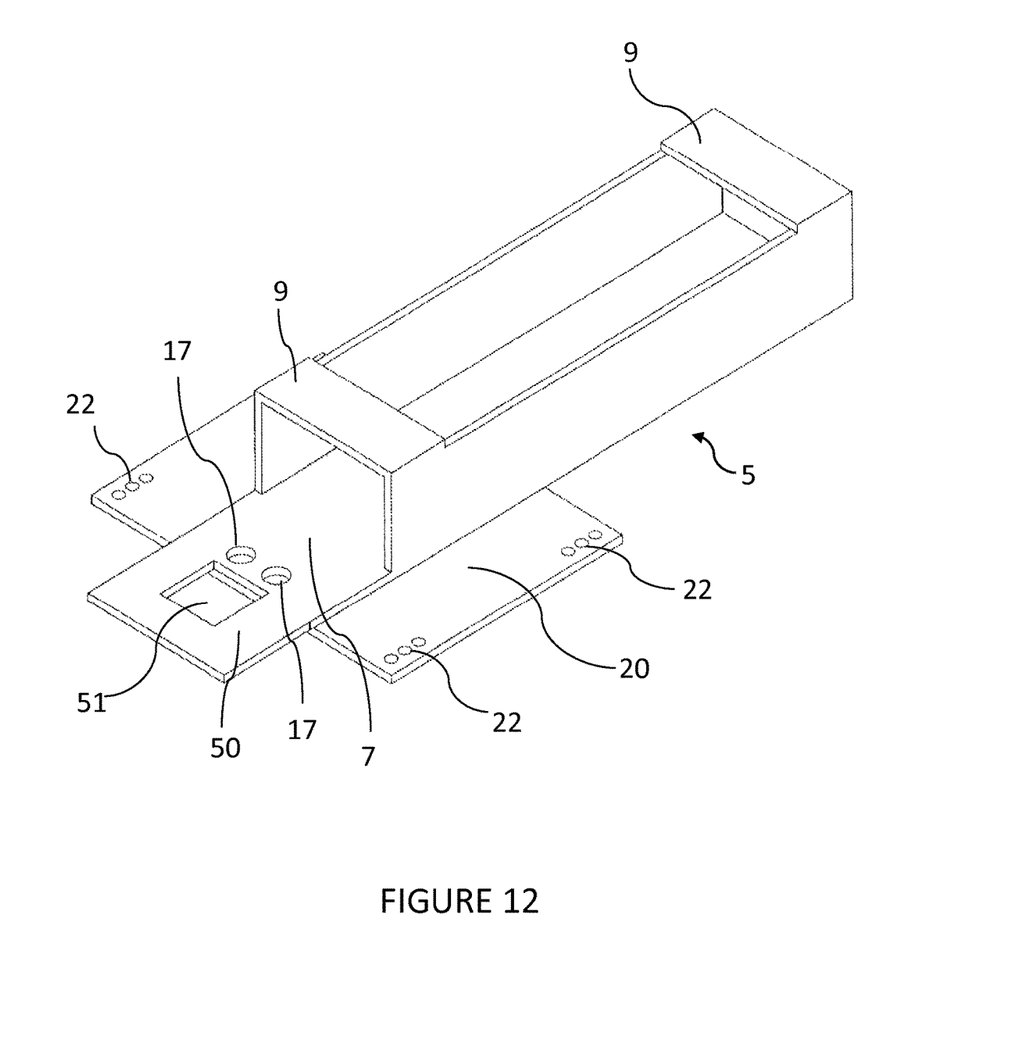

Referring to FIG. 12, an alternate embodiment of the trailer weight distribution system storage device is a one piece device made up of a spring bar channel 5 and cross braces 9 as described above, a tongue 7 affixed to the spring bar channel 5 as described above, and a vertical shank channel 50 affixed to the tongue 7. The tongue has two trunnion bar pin holes 17 as described above drilled through it. The vertical shank channel 50 can be constructed of a flat plate, with the thickness of the tongue 7 and having a square hole cut 51 out of it, the dimensions of the square hole being slightly larger than the dimensions of the ball mount shank 27. A flat plate 20 with mounting holes 22 as described above with can be affixed to the bottom of the tongue 7 spring bar channel 5 by welding or other means known to those skilled in the art. The different spring bars 1, 2 & 3 for the different weight distribution systems can be installed in the same manners as the preferred embodiment, referring to FIG. 9, FIG. 10, and FIG. 11. This embodiment can be affixed to a structural member 39 through the same means as the preferred embodiment, referring to FIG. 2. This embodiment is not as versatile as the preferred embodiment, but will be less expensive to construct.

The invention claimed is:

1. A device for storing and enclosing a plurality of spring bars and a ball mount during periods they are not in use, comprising:
    a spring bar storage enclosure comprising a spring bar channel, a tongue, and a plurality of parallel tabs;
    a base plate comprising a flat plate, a plurality of downward-sloping support members, a bar, and a vertical shank storage channel;
    the spring bar storage enclosure being pivotably attached to the base plate;
    the tongue connecting the spring bar channel and the vertical shank storage channel such that the two channels are approximately perpendicular to each other.

2. The storage device of claim 1, further comprising:
    the spring bar channel having a predetermined cross-sectional area and length large enough to support and secure the plurality of spring bars.

3. The storage device of claim 1, further comprising:
    the ball-mount channel having a predetermined cross-sectional area and length large enough to support and secure the ball mount.

4. The storage device of claim 1, further comprising:
    a plurality of holes, exactly one hole being located within each of the plurality of parallel tabs, each hole being located near a bottom edge of its respective tabs.

5. The storage device of claim 1, further comprising:
    a height adjustment hole located in a centerline of a base of the spring bar channel.

6. The storage device of claim 1, further comprising:
    a height adjustment slot located in a centerline and along a rear edge of the flat plate.

7. The storage device of claim 1, further comprising:
    a plurality of hinge holes located within the downward sloping support members at a predetermined height.

8. The storage device of claim 1, further comprising:
    one or more cross braces located across the top of the spring bar channel.

9. The storage device of claim 1, further comprising:
    the tongue having a length sufficient to provide a distance between the spring bar and vertical shank storage channel such that, during use, a plurality of spring bars are stored and enclosed within the spring bar channel and a ball mount is inserted within the vertical shank storage channel.

10. The storage device of claim 9, further comprising:
during use, the heads of a plurality of spring bars abut the tongue and the ball mount rests on top of the spring bar heads.

11. The storage device of claim 1, the vertical shank storage channel further comprising a first lock-hole of a predetermined location and diameter such that once the ball mount is installed in the vertical shank storage channel, a locking device is installed in a corresponding lock hole located within a shank of the ball mount.

12. The storage device of claim 11, further comprising:
the first lock-hole corresponding with a second lock-hole located on the shank, the first lock-hole being located below the bottom of the vertical shank storage channel.

13. The storage device of claim 1, the spring bar storage enclosure further comprising a hinge mechanism for permitting vertical adjustment of the spring bar channel.

14. The storage device of claim 1, the tongue member further comprising two pin holes adapted to accommodate a plurality of spring bars having corresponding pin holes.

15. The storage device of claim 1, further comprising:
the vertical shank storage channel having two pin holes.

16. The storage device of claim 1, further comprising:
the vertical shank storage channel being affixed to the flat plate and integrated into the plurality of downward-sloping members.

17. The storage device of claim 1, further comprising:
the bar being affixed to the front edges of and connecting the plurality of downward-sloping parallel support members.

18. The storage device of claim 17, further comprising:
the vertical shank storage channel being U-shaped.

19. The storage device of claim 1, further comprising:
the base plate being roughly square-shaped and having four corners, the base plate having clamping holes drilled through the four corners.

* * * * *